(12) United States Patent
Tjan (10) Patent No.: US 6,688,785 B2
(45) Date of Patent: Feb. 10, 2004

(54) SYSTEMS AND METHODS FOR PROVIDING PRINTED COVERS FOR PRINT JOBS

(75) Inventor: Anita Tjan, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/165,479

(22) Filed: Jun. 7, 2002

(65) Prior Publication Data

US 2003/0228183 A1 Dec. 11, 2003

(51) Int. Cl.[7] ............................. B41J 11/44; B42D 3/00
(52) U.S. Cl. ............................................ 400/76; 281/29
(58) Field of Search ....................... 400/61, 76, 70; 462/22, 66, 71, 72, 74, 75, 76, 78; 281/3.1, 4, 4.1, 17, 18, 20, 21.1, 29; 283/61, 65; 412/4, 6, 18, 19; 53/410, 449, 168, 545, 389.1, 389.2

(56) References Cited

U.S. PATENT DOCUMENTS

| | | | | |
|---|---|---|---|---|
| 5,124,731 A | * | 6/1992 | Knodt et al. ................ 347/129 |
| 5,247,591 A | * | 9/1993 | Baran .......................... 382/179 |
| 5,316,279 A | | 5/1994 | Corona et al. |
| 5,752,053 A | * | 5/1998 | Takakura et al. ............ 715/505 |
| 5,765,874 A | * | 6/1998 | Chanenson et al. ........... 283/67 |
| 5,988,620 A | | 11/1999 | Graushar |
| 2002/0059338 A1 | * | 5/2002 | Nishikawa et al. ......... 707/500 |
| 2002/0181985 A1 | * | 12/2002 | Hatayama .................... 400/61 |

* cited by examiner

Primary Examiner—Stephen R. Funk
Assistant Examiner—Hoai-An D. Nguyen (57) ABSTRACT

Print systems are provided. One such print system includes a printing device that is operative to receive information corresponding to a print job. The printing device also is operative to receive a request for a cover to be printed in association with the print job, and print the print job and the cover. In particular, the printing device automatically places the cover and the print job in a sequence so that the cover immediately preceding a first page of the print job. Methods, computer-readable media and other systems also are provided.

17 Claims, 7 Drawing Sheets

SYSTEMS AND METHODS FOR PROVIDING PRINTED COVERS FOR PRINT JOBS

BACKGROUND OF THE INVENTION

1. Field of the Invention

The present invention generally relates to printing and, in particular, to systems and methods that enable covers to be printed for print jobs.

2. Description of the Related Art

There are many instances in which it is desirable to provide a cover for printed materials. By way of example, when a student intends to submit a research paper, it is customary to provide a cover for the paper. Such a cover can be purchased from an office supply store, for example.

Typically, two types of covers are used—transparent covers and opaque covers. Transparent covers are convenient to use because a cover sheet that includes the title of the paper, for example, can be viewed through the transparent cover. However, these transparent covers oftentimes do not provide a significant visual impact to the reader. In contrast, opaque covers can be formed in a variety of colors and can incorporate colored design elements to provide a more significant visual impact to a reader. Unfortunately, opaque covers typically are manufactured in a relatively limited number of styles. Additionally, customizing such an opaque cover to include information, such as a title, oftentimes is done with handwritten text and, therefore, can appear unprofessional. Therefore, there is a need for improved systems and methods that address these and/or other shortcomings of the prior art.

SUMMARY OF THE INVENTION

The present invention involves printing covers for print jobs. In this regard, an embodiment of a print system in accordance with the invention includes a printing device that is operative to receive information corresponding to a print job. The printing device also is operative to receive a request for a cover to be printed in association with the print job, and print the print job and the cover. In particular, the printing device automatically places the cover and the print job in a sequence so that the cover immediately precedes a first page of the print job.

An embodiment of a method in accordance with the invention includes: receiving information corresponding to a print job; receiving a request for a cover to be printed in association with the print job; providing a selection of cover templates; enabling an operator to select a cover template from among the selection of cover templates; and printing the print job and the cover, the cover corresponding to the cover template selected.

Another embodiment of a method in accordance with the invention includes: receiving a request for a cover to be printed in association with a print job; providing a selection of cover templates; enabling an operator to select a cover template from among the selection of cover templates; and enabling the print job and the cover to be printed, the cover corresponding to the cover template selected.

Still another embodiment of a method in accordance with the invention includes: receiving a request for digital information corresponding to a cover to be printed in association with a print job, the request being received via a communication network; accessing digital information corresponding to a cover, the digital information being stored in memory; and providing the digital information via the communication network.

An embodiment of a computer-readable medium in accordance with the invention includes logic configured to receive information corresponding to a print job and logic configured to receive a request for a cover to be printed in association with the print job. The computer-readable medium also incorporates logic configured to enable the print job and the cover to be printed such that the cover and the print job are automatically placed in a sequence with the cover immediately preceding a first page of the print job.

An embodiment of a computer-readable medium in accordance with the invention includes: logic configured to receive a request for a cover to be printed in association with a print job; logic configured to provide an operator with a graphical representation of a cover template available for printing; logic configured to enable the operator to select the cover template for printing; and logic configured to enable printing of the print job and the cover, the cover corresponding to the cover template.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in detail here, systems and methods of the invention involve the production of printed covers that can be used with printed materials. Typically, the covers are printed by a printing device that also is used to print the materials with which the covers are to be used. This enables an operator to conveniently produce a cover without having to use and/or modify a pre-manufactured cover, such as a cover typically provided at a retail store.

Figure 1:
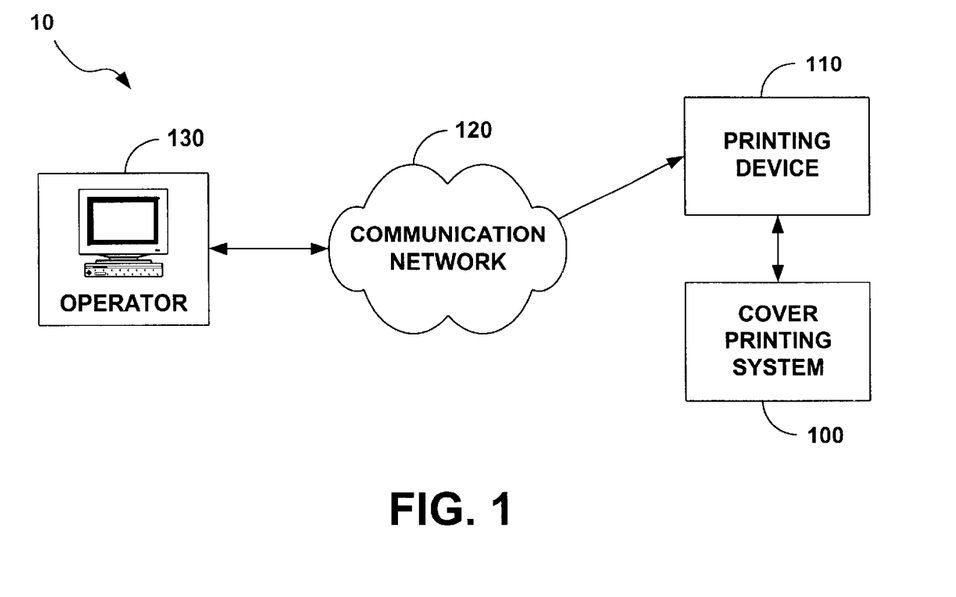
FIG. 1 is a schematic diagram depicting an embodiment of a print system in accordance with the present invention.

Referring now to the drawings, FIG. 1 is a schematic diagram depicting an embodiment of a print system in accordance with the present invention. As shown in FIG. 1, print system 10 includes a cover printing system 100 that communicates with a printing device 110. As used herein, the term "printing device" refers to any device or combination of devices that are able to produce printed hardcopy. Thus, the term "printing device" includes printers, facsimile machines, copiers and multifunction devices, among others.

The printing device 110 and/or cover printing system 100 communicate with a communication network 120. Communication network 120 enables communication of the printing device and/or cover printing system with various computing devices. As used herein, the term "computing device" refers to any device or combination of devices that are able to send, store and/or receive information via a communication network.

Note, communication network 120 may be any type of communication network employing any network topology, transmission medium, or network protocol. For example, such a network may be any public or private packet-switched or other data network, including the Internet, circuit-switched networks, such as the public switched telephone network (PSTN), wireless network, or any other desired communications infrastructure and/or combination of infrastructures.

In FIG. 1, printing device 110 and/or cover printing system 100 communicate with an operator 130 via communication network 120. Although operator 130 is shown using a workstation, various other computing devices could be used to facilitate communication with the printing device 110 and/or cover printing system 100. By way of example, a laptop or a personal digital assistant (PDA) could be used.

Figure 2:
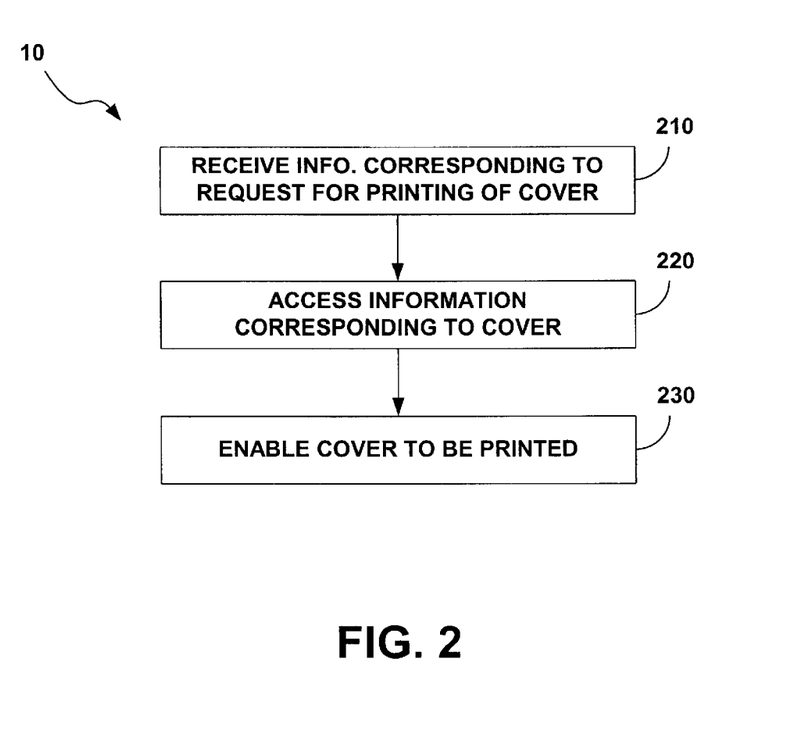
FIG. 2 is a flowchart depicting functionality of the embodiment of the print system of FIG. 1.

Functionality of print system 10 of FIG. 1 is depicted in the flowchart of FIG. 2. As depicted in FIG. 2, the functionality (or method) 10 may be construed as beginning at block 210, where information corresponding to a request for printing of a cover is received. For instance, such a request could be initiated by the operator, such as via the workstation or the printing device as will be described later. In block 220, information corresponding to the cover is accessed. In particular, the cover printing system facilitates the retrieval of information used for printing the desired cover. Thereafter, such as depicted in block 230, the cover is enabled to be printed by the printing device.

Cover printing systems 100 in accordance with the invention enable covers of various types and styles to be produced. By way of example, covers can have solid backgrounds of different colors, foreground features such as borders or accents, and/or gradient fills. Clearly, the variety of covers is virtually limitless given the number of colors and/or combinations of shapes and textures that can be printed onto print media by printing devices. Note, the print media upon which a cover design is printed typically is paper, although various other print media can be used. By way of example, plastic sheets, paper board, canvas and leather can be used. Cover printing systems 100 in accordance with the invention can be implemented in software, firmware, hardware, or a combination thereof. When implemented in hardware, cover printing system 100 can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

Figure 3:
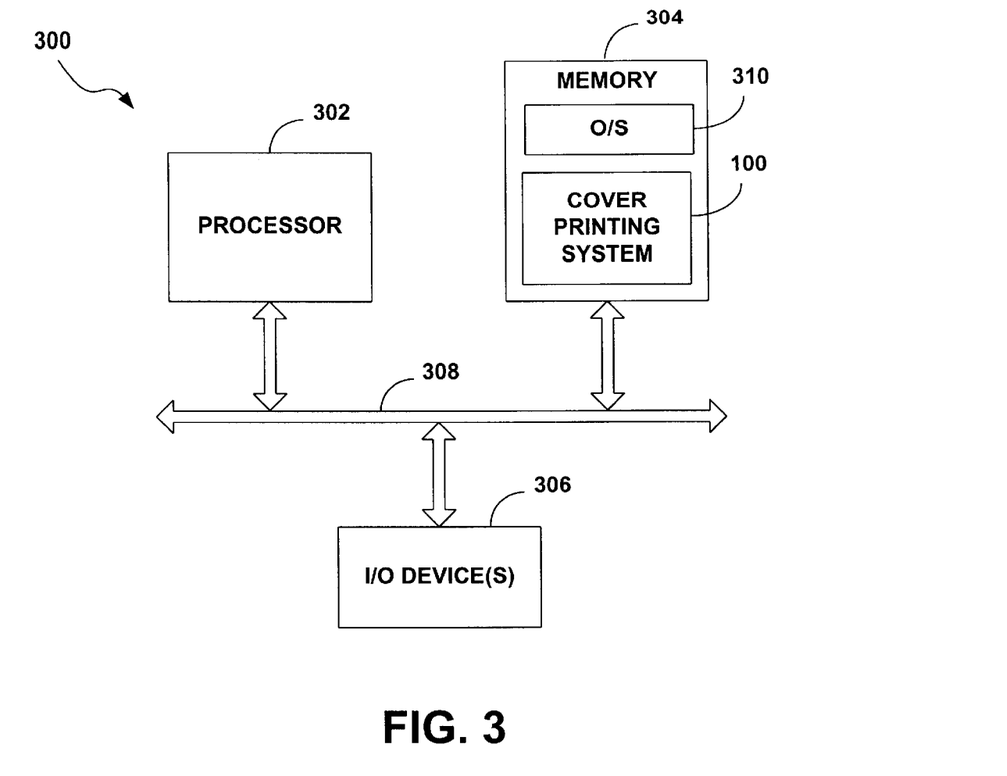
FIG. 3 is a schematic diagram depicting a computer or processor-based system that can be used to implement the cover printing system of FIG. 1.

When implemented in software, cover printing system 100 can be a program that is executable by a digital computer, an example of which is depicted schematically in FIG. 3. Note, computer 300 of FIG. 3 is particularly configured as a printing device, although various other embodiments could merely be adapted to communicate with printing devices.

In FIG. 3, computer 300 includes a processor 302, memory 304, and one or more input and/or output (I/O) devices 306 (or peripherals) that are communicatively coupled via a local interface 308. Processor 302 can be a hardware device configured to execute software that can be stored in memory 304. Memory 304 can include any combination of volatile memory elements and/or nonvolatile memory elements. Moreover, memory 304 can incorporate electronic, magnetic, optical, and/or other types of storage media. Note that memory 304 can have a distributed architecture, where various components are situated remote from one another, but can be accessed by processor 302.

The software in memory 304 can include one or more separate programs, each of which comprises an ordered listing of executable instructions for implementing logical functions. The software in the memory 304 includes cover printing system 100 and an operating system (O/S) 310. The operating system 310 controls the execution of other computer programs, such as cover printing system.

The I/O device(s) 306 can include input devices such as a keypad and/or a touch screen, for example. I/O device(s) 306 also can include output devices such as a display device or speaker, for example. I/O device(s) 306 may further include devices that are configured to communicate both inputs and outputs such as a communication interface.

When cover printing system 100 is implemented in software, it should be noted that the cover printing system can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. Cover printing system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can store, communicate, propagate or transport a program for use by or in connection with an instruction execution system, apparatus, or device. Thus, a computer readable medium can be, for example but not limited to, an electronic, magnetic, optical, electromagnetic, infrared, or semiconductor system, apparatus, device, or propagation medium. More specific examples (a nonexhaustive list) of a computer-readable media include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program could be electronically captured, via optical scanning of the paper or other medium, then compiled, interpreted or otherwise processed in a suitable manner, if necessary, and then stored in a computer memory.

Reference will now be made to the flowchart of FIG. 4, which depicts the functionality of an embodiment of cover printing system 100 in accordance with the invention. In this regard, each block of the flowchart represents a module segment or portion of code that comprises one or more executable instructions for implementing the specified logical function(s). It should also be noted that in some alternative implementations the functions noted in various blocks of FIG. 4, or any other of the accompanying flowcharts, may occur out of the order in which they are depicted. For example, two blocks shown in succession in FIG. 4 may, in fact, be executed substantially concurrently. In other embodiments, the blocks may sometimes be executed in the reverse order depending upon the functionality involved.

Figure 4:
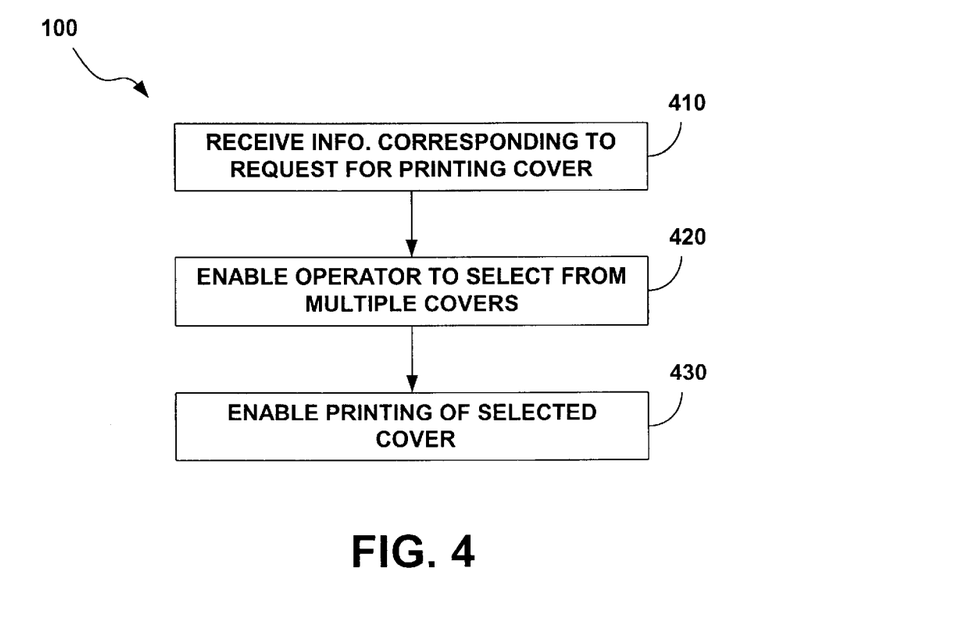
FIG. 4 is a flowchart depicting functionality of an embodiment of a cover printing system in accordance with the present invention.

As shown in FIG. 4, the functionality (or method) 100 may be construed as beginning at block 410, where information corresponding to a request for printing a cover is received. As mentioned before, such a request can be received via a communication network or via a printing device that is to be used for printing the cover. In block 420, an operator is enabled to select from multiple covers. For example, the operator could be provided with a graphical representation of a cover template, e.g., a thumbnail, that corresponds to a cover that is able to be printed. Thereafter, such as depicted in block 430, printing of the selected cover is enabled.

Figure 5:
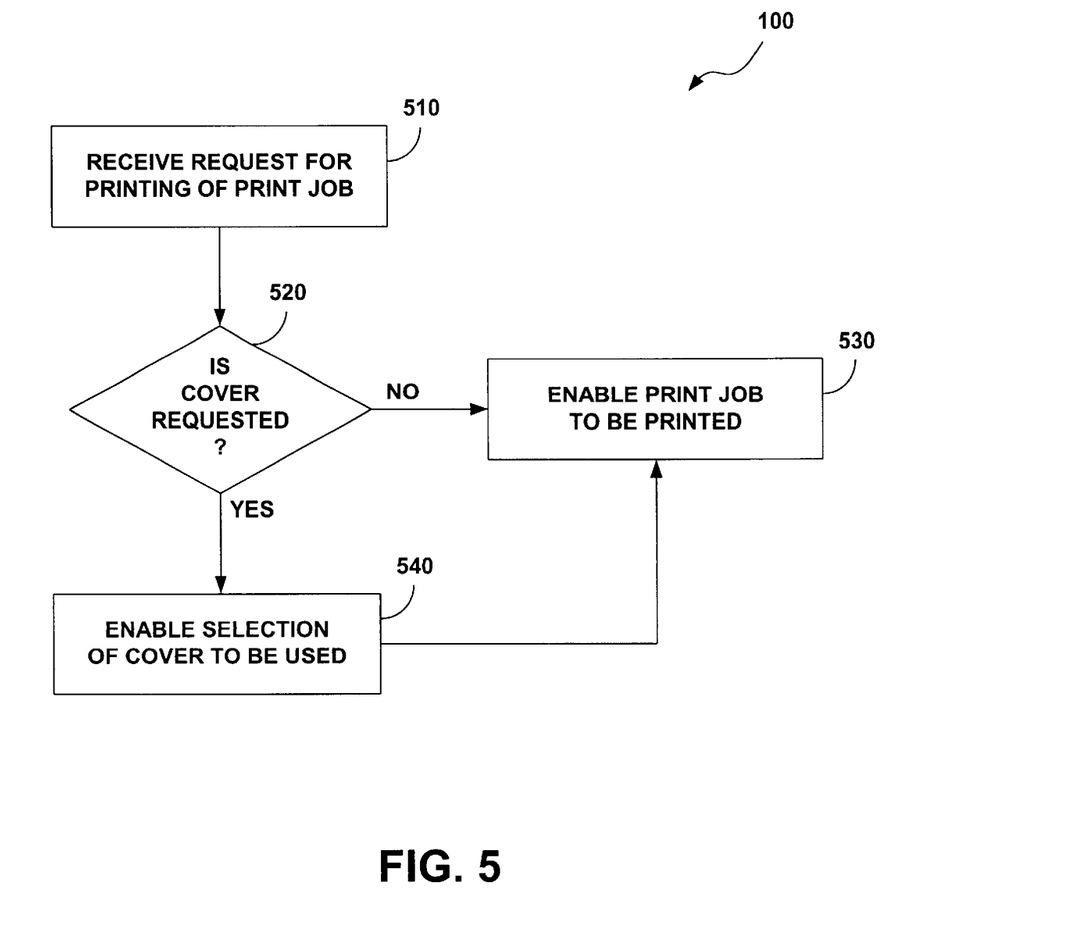
FIG. 5 is a flowchart depicting functionality of an embodiment of a cover printing system in accordance with the present invention.

Functionality of another embodiment of cover printing system 100 in accordance with the invention will now be described with reference to FIG. 5. As shown in FIG. 5, the functionality (or method) 100 may be construed as beginning at block 510, where a request for printing of a print job is received. Thereafter, such as depicted in block 520, a determination is made as to whether a cover is requested. If it is determined that a cover has not been requested, the process may proceed to block 530, where the print job is enabled to be printed. If, however, it is determined that a cover has been requested, the process may proceed to block 540. In block 540, the operator is enabled to select a cover that is to be used with the print job. Thereafter, the process may return to block 530 where the print job, including the selected cover, is enabled to be printed.

Preferably, the print system enables the cover to be placed at the appropriate location with respect to the other printed hardcopy. That is, the cover should either be the first or last hardcopy in the stack of printed hardcopy associated with the print job. In this manner, the print job should be ordered and prepared for use. Thus, in some embodiments, the cover printing system may be able to alter the print queuing protocol of the printing device to ensure that the hardcopy is printed in the desired order. In other embodiments, ordering of the information corresponding to the print job and the cover can take place before the information arrives at the printing device.

In order to facilitate the requesting of a cover that is to be printed with a print job, various techniques can be used. By way of example, a printing device can provide a display or other mechanism for enabling a user to select a cover for printing. Thus, a user could be prompted about the use of a cover with an appropriate message on the display device. The user can then be enabled to make an appropriate selection by interfacing with the display, such as when the display is capable of touch screen actuation, or by depressing an actuator, such as a key of a key pad.

In other embodiments, the operator can request the use of a cover by using a graphical user interface associated with a computing device. An embodiment of a graphical user interface that can be used to implement this functionality is depicted in schematically in FIG. 6.

Figure 6:
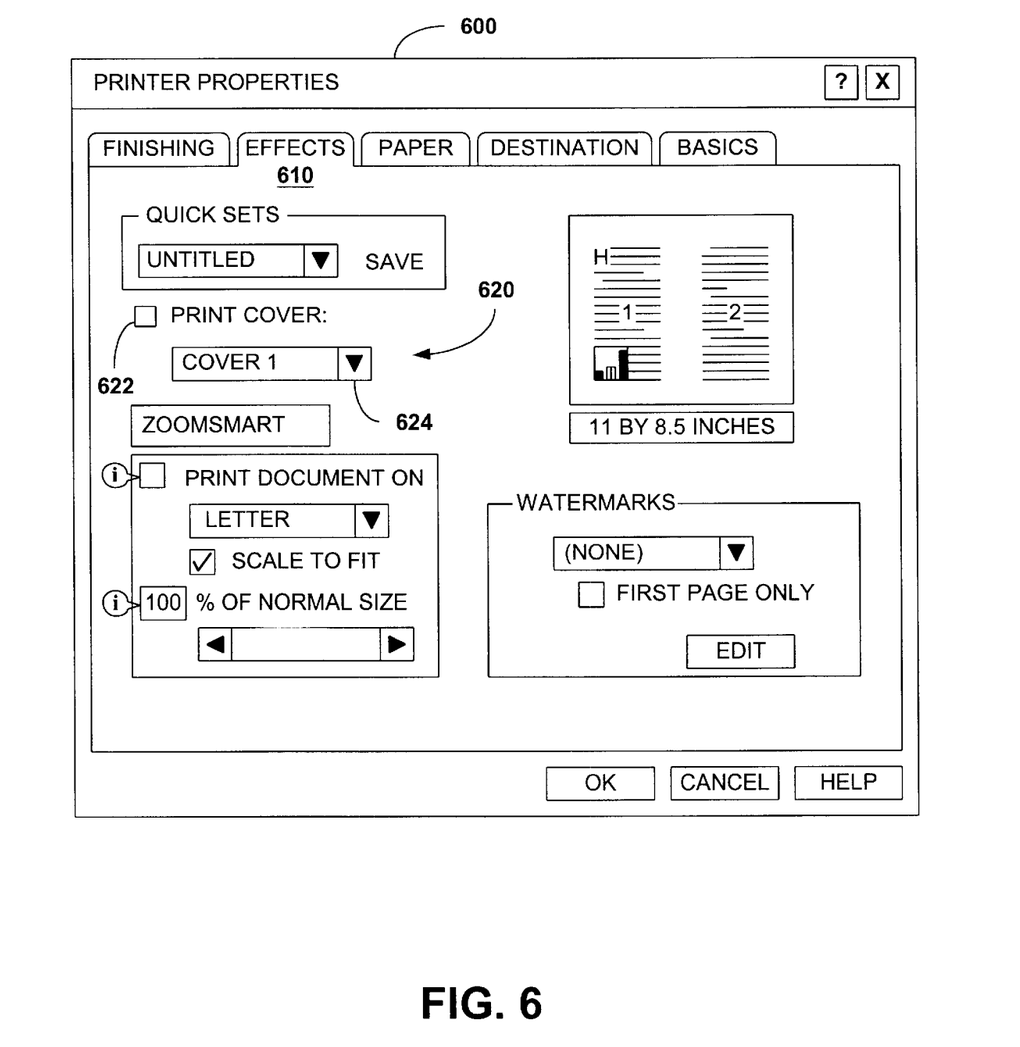
FIG. 6 is a schematic diagram depicting a representative graphical user interface that can be used to implement an embodiment of a print system in accordance with the present invention.

As shown in FIG. 6, graphical user interface (GUI) 600 is functionally implemented as a portion of a printer driver interface. Note, however, that in other embodiments, the graphical user interface associated with a cover printing system could be associated with an application other than a printer driver or could be configured as a stand-alone implementation.

Figure 7:
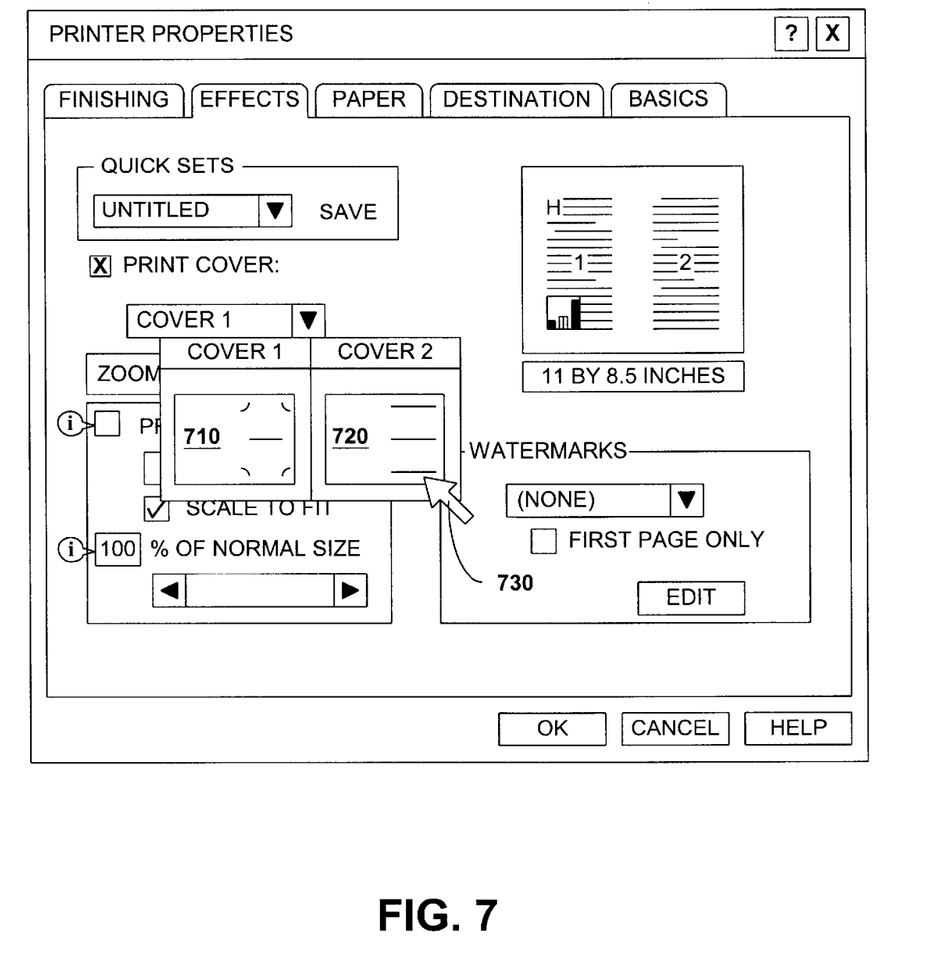
FIG. 7 is a schematic diagram depicting the graphical user interface of FIG. 7, shown after cover printing system functionality has been actuated.

GUI 600 of FIG. 6 includes an "effects" page 610 that provides various print functions. In particular, effects page 610 includes a print cover field 620 that can be selected by actuating actuator 622. Drop-down menu 624 then can be actuated. FIG. 7 schematically depicts a response of GUI 600 to actuation of drop-down menu 624.

As shown in FIG. 7, actuation of drop-down menu 624 displays cover templates, e.g., templates 710 and 720. Each of these templates includes a graphical representation, such as a thumbnail, that is indicative of the cover that may be printed upon selection of the template. The graphical representation provides an operator with a general idea of the layout and stylistic content, for example, of the covers available for printing. Clearly, a multitude of covers could be displayed to the user. Note, a particular template can be selected by use of cursor 730, for example.

Figure 8:
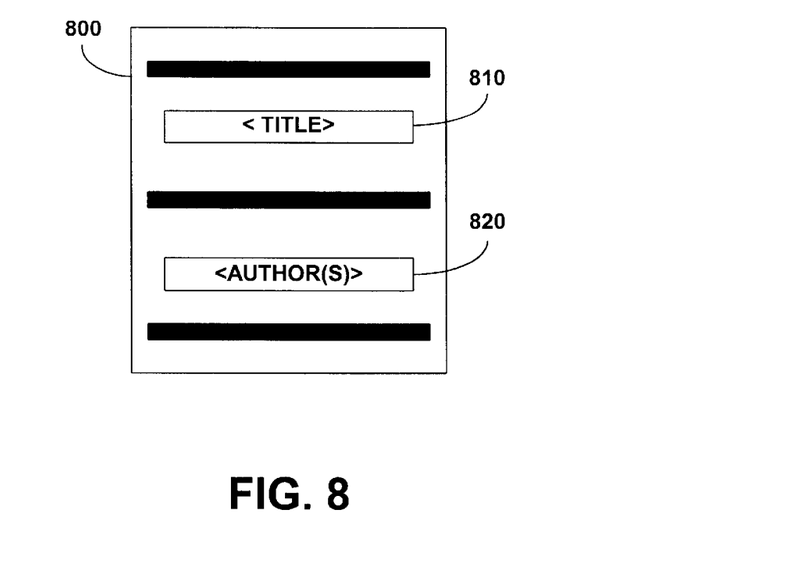
FIG. 8 is a schematic diagram depicting a representative cover template associated with the graphical user interface of FIG. 7.

As shown in FIG. 8, selection of one of the cover templates can enable a more detailed graphical representation of the selected cover to be provided to the operator. In particular, selection of cover template 720 of FIG. 7 enables thumbnail 800 to be displayed to the operator. Thumbnail 800 includes text fields that can be used for customizing a cover. In particular, thumbnail 720 includes a "title" field 810 and an "author" field 820. Typically, an operator enters corresponding textual data into the fields that will be printed with the printed cover. Clearly, various types of text fields in addition to, or in lieu of, those depicted in FIG. 8 can be used.

Figure 9:
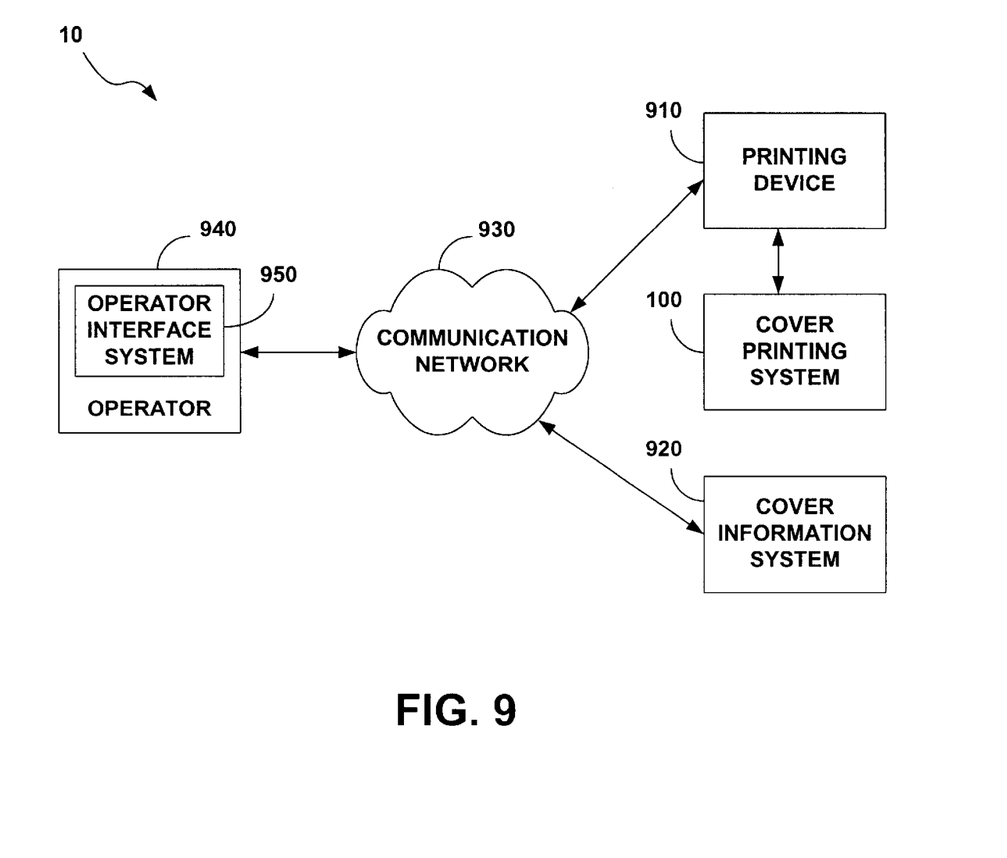
FIG. 9 is a schematic diagram depicting an embodiment of a print system in accordance with the present invention.

Another embodiment of a print system 10 in accordance with the invention is depicted in schematically in FIG. 9. As shown in FIG. 9, cover printing system 100 communicates with a printing device 910. The cover printing system 100 and/or printing device 910 communicate with a cover information system 920 via a communication network 930. These various systems and devices also can communicate with an operator 940 such as via an operator interface system 950. The operator interface system 950 provides an operator interface, such as GUI 600 of FIG. 6, so that an operator can communicate with cover printing system 100. Since this functionality was described with respect to FIGS. 6–8, such representative functionality will not be described again here.

In operation, when an operator desires printing of a print job and an accompanying printed cover, the operator can interact with operator interface system 950 in an attempt to select an appropriate cover for the print job. Information corresponding to the covers available for printing can be stored in various locations and can be associated, for example, with the operator interface system 950, a computing device used by the operator, printing device 910 and/or cover printing system 100. In some embodiments, information corresponding to various covers can be provided by another system. In particular, a cover information system 920 can be used.

Cover information systems 920 can be implemented in a variety of configurations. More specifically, cover information systems 920 in accordance with the invention can be implemented in software, firmware, hardware, or a combination thereof, such as described before with respect to the cover printing system.

For instance, such a cover information system can be implemented in software and facilitated by a Web server that communicates with an operator interface system and/or a cover printing system via the Internet. In such an embodiment, when an operator is provided with a limited selection of cover templates from which to choose, the operator can be provided with a prompt that enables a request for additional cover templates to be provided to the cover information system. In response to the request, the cover information system can automatically access stored cover templates and then provide one or more of the cover templates to augment the selection of cover templates provided to the operator.

Embodiments of the cover information system could be formatted as a pay-per-use service provider or could be provided as an add-on service to the operator. Regardless of the particular configuration used, the cover information system is adapted to augment the cover template selections offered to an operator. Functionality of the embodiment of the cover printing system 100 of FIG. 9 is depicted in the flowchart of FIG. 10.

Figure 10:
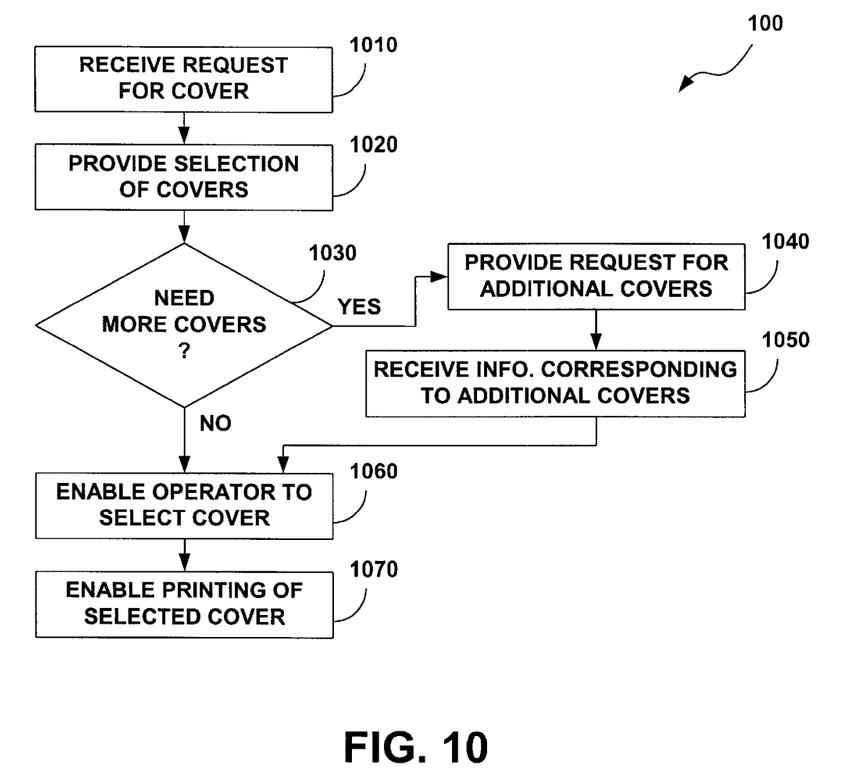
FIG. 10 is a flowchart depicting functionality of the embodiment of the cover printing system of FIG. 9.

As shown in FIG. 10, the functionality (or method) 100 may be construed as beginning at block 1010, where a request for printing a cover is received. In block 1020, an operator is provided with a selection of covers from which to choose. In block 1030, a determination is made as to whether the selection of covers is to be augmented with more covers from which to choose. If it is determined that more covers are desired, the process may proceed to block 1040, where a request for additional covers is provided. In particular, the request can be provided to a service that stores information associated with additional covers, e.g., a service facilitating a cover information system. Such a service could be contacted automatically via a communication network and can be facilitated via a Web server.

In block 1050, information corresponding to additional covers is received. Thereafter, such as depicted in block 1060, an operator is enabled to select from among the choices of covers provided. Note, the process may also proceed to block 1060 if it is determined in block 1030 that additional covers were not needed. In block 1070, and once a cover has been selected, printing of the selected cover is enabled.

Figure 11:
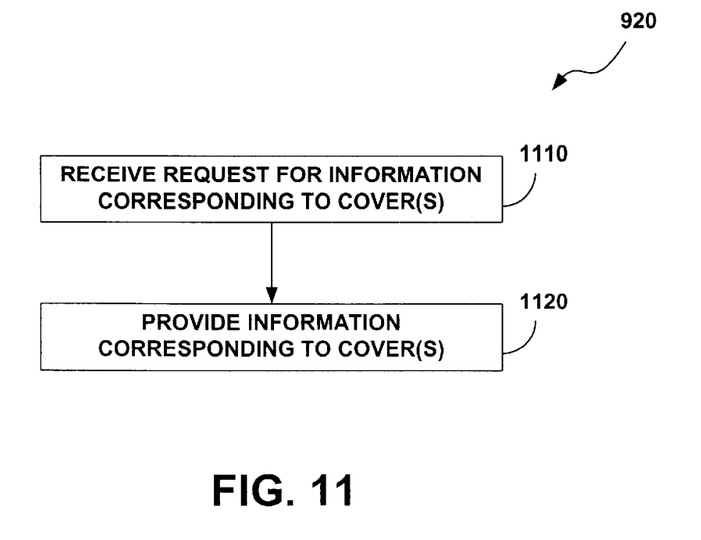
FIG. 11 is a flowchart depicting functionality of the operator interface of FIG. 9.

Functionality corresponding to the embodiment of the cover information system 920 of FIG. 9 is depicted in the flowchart of FIG. 11. As shown in FIG. 11, the functionality (or method) 920 may be construed as beginning at block 1110, where a request for information corresponding to an additional cover(s) is received. In block 1120, information corresponding to the cover(s) is provided, such as via a communications network. Clearly, the aforementioned functionality could be accomplished automatically, i.e., without the intervention of an operator.

It should be emphasized that the above-described embodiments of the present invention are merely possible examples of implementations set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method for providing a cover for a print job comprising:
   receiving information corresponding to the print job;
   receiving a request for the cover to be printed in association with the print job;
   providing a selection of cover templates;
   enabling an operator to select a cover template from among the selection of cover templates;
   determining that the operator has not selected a cover template from among the selection of cover templates;
   automatically requesting information corresponding to additional cover templates via a communication network;
   receiving information corresponding to the additional cover templates via the communication network;
   providing a revised selection of cover templates including the additional cover templates;
   enabling the operator to select a covers template from among the revised selection of cover templates; and
   printing the print job and the cover, the cover corresponding to the cover template selected.

2. The method of claim 1, wherein at least one of the cover templates includes a title field within which textual data can be displayed; and
   further comprising:
   enabling the operator to provide textual data for printing in the title field.

3. The method of claim 1, wherein providing the selection of cover templates comprises:
   accessing information corresponding to cover templates able to be printed; and
   providing an operator with graphical information corresponding to the cover templates.

4. The method of claim 3, wherein providing the operator with graphical information comprises providing the operator with a thumbnail graphical representation of each of the cover templates.

5. The method of claim 1, further comprising:
   enabling the operator to modify the cover by providing textual data to be printed with the cover.

6. The method of claim 1, wherein printing the print job and the cover comprises automatically placing the cover and the print job in a sequence such that, after printing, the cover immediately precedes a first page of the print job.

7. A method for providing a cover for a print job comprising:
   receiving a request for the cover to be printed in association with the print job;
   providing a selection of cover templates;
   enabling an operator to select a cover template from among the selection of cover templates;
   determining that the operator has not selected a cover template from among the selection of cover templates;
   automatically requesting information corresponding to additional cover templates via a communication network;
   receiving information corresponding to the additional cover templates via the communication network;

providing a revised selection of cover templates including the additional cover templates;

enabling the operator to select a template from among the revised selection of cover templates; and enabling the print job and the cover to be printed, the cover corresponding to the cover template selected.

8. The method of claim 7, wherein at least one of the cover templates includes a title field and an author field, within each of which textual data can be displayed; and further comprising:

enabling the operator to provide textual data for printing in the title field and the author field.

9. The method of claim 7, wherein providing the selection of cover templates comprises:

providing a graphical user interface;

accessing information corresponding to cover templates able to be printed; and providing the operator with thumbnail graphical representations of each of the cover templates via the graphical user interface.

10. The method of claim 9, wherein enabling the operator to select a cover template comprises:

enabling the operator to select one of the thumbnail graphical representations;

displaying a text field of the thumbnail graphical representation selected to the operator, the text field being configured to include textual data for display as a portion of the cover; and enabling the operator to provide textual data for printing in the text field.

11. A print system comprising:

a printing device operative to receive information corresponding to a print job, receive a request for a cover to be printed in association with the print job, and print the print job and the cover such that the cover and the print job are automatically placed in a sequence with the cover immediately preceding a first page of the print job;

wherein the printing device is further operative to provide a selection of cover templates, and enable an operator to select a cover template from among the selection of cover templates such that the cover printed corresponds to the cover template selected;

wherein the printing device is adapted to communicate with the Internet and is operative to automatically request information corresponding to additional cover templates via the Internet if it is determined that the operator has not selected a cover template from the selection of cover templates, receive information corresponding to additional cover templates via the Internet, and use the information corresponding to the additional cover templates to provide the selection of cover templates to the operator.

12. The print system of claim 11, wherein the cover template selected includes a text field; and wherein the printing device is further operative to enable the operator to provide textual data for printing in the text field.

13. The print system of claim 11, further comprising:

an operator interface system operative to provide the operator with a graphical user interface (GUI), the GUI being operative to provide the operator with graphical representations of each of the cover templates available for printing, and enable the operator to select one of the cover templates for printing.

14. The print system of claim 11, further comprising:

means for providing the operator with graphical representations of each of the cover templates available for printing; and means for enabling the operator to select one of the cover templates for printing.

15. A computer-readable medium storing a computer program for providing a cover for a print lob, said computer-readable medium comprising:

logic configured to receive information corresponding to the print job;

logic configured to receive a request for the cover to be printed in association with the print job;

logic configured to provide a selection of cover templates;

logic configured to enable an operator to select a cover template from among the selection of cover templates such that the cover printed corresponds to the cover template selected;

logic configured to automatically request information corresponding to additional cover templates via the Internet if it is determined that the operator has not selected a cover template from the selection of cover templates;

logic configured to receive information corresponding to additional cover templates via the Internet;

logic configured to use the information corresponding to the additional cover templates to provide the selection of cover templates to the operator; and logic configured to enable the print job and the cover to be printed such that the cover and the print job are automatically placed in a sequence with the cover immediately preceding a first page of the print job.

16. The computer-readable medium of claim 15, further comprising:

logic configured to provide the operator with a graphical representation of a cover template available for printing;

wherein the graphical representation is a thumbnail graphical representation of the cover template.

17. The computer-readable medium of claim 15, wherein the logic configured to enable the operator to select the cover template comprises:

logic configured to display a text field of the thumbnail to the operator, the text field being configured to include textual data for display as a portion of the cover; and logic configured to enable the operator to provide textual data for printing in the text field.

* * * * *